July 15, 1952  E. J. FARKAS ET AL  2,603,109
AUTOMATIC TRANSMISSION
Filed Dec. 13, 1946  4 Sheets-Sheet 1 fig.1

E. J. FARKAS
J. F. SWIFT
INVENTORS

BY
ATTORNEYS.

July 15, 1952　　　E. J. FARKAS ET AL　　　2,603,109
AUTOMATIC TRANSMISSION

Filed Dec. 13, 1946　　　　　　　　　　　　4 Sheets-Sheet 4

E. J. FARKAS
J. F. SWIFT
INVENTORS

BY

ATTORNEYS.

Patented July 15, 1952

2,603,109

UNITED STATES PATENT OFFICE 2,603,109

AUTOMATIC TRANSMISSION

Eugene J. Farkas, Detroit, and John F. Swift, Royal Oak, Mich., assignors to Ford Motor Company, Dearborn, Mich., a corporation of Delaware Application December 13, 1946, Serial No. 716,140

4 Claims. (Cl. 74—732)

This invention relates generally to a transmission, and more particularly to a vehicle transmission of the automatic type.

The present invention comprises an improvement of the automatic transmission disclosed in U. S. Patent No. 2,528,584, dated November 7, 1950. The transmission of the said patent includes a multiple planetary gearing system adapted to transmit torque at three different speed ratios, with the transition from first to second speed, and from second to third speed, taking place automatically by the operation of second and third speed clutches which are activated by fluid under pressure supplied by a fluid pump and regulated by governor-controlled hydraulic valve means. This transmission also incorporates a fluid coupling, operative in low and reverse speeds, but by-passed in second and third speed ratios. Although this transmission has proven very satisfactory, and is particularly adapted to relatively low cost production, it has been felt that it would be desirable in certain vehicles to have an automatic transmission with even better performance and smoothness of operation, although possibly somewhat higher in cost.

The foregoing aims have been accomplished in the transmission of the present invention, in which a three element torque converter is employed in an automatic transmission of the multiple planetary gearing type and in which the torque converter is arranged to be incorporated into the power train in all forward speed ratios and in reverse as well. Inasmuch as a torque converter has a continuously variable speed and torque range within certain limits, a high starting torque can be obtained without the necessity of using a high gear ratio in low speed, and the torque will be continuously decreased as the speed increases throughout the range of the converter. The wide range of the converter provides maximum performance during the initial acceleration, and permits the planetary gearing system of the transmission to be designed with such gear ratios that the steps between adjacent ratios can be made much smaller. Not only does this increase the performance of the transmission during the upper portion of its operation range, but in addition the smaller steps between speed ratios makes possible smoother shifts than otherwise obtainable. Furthermore, a lower rear axle ratio may be used, so that the effect and performance of a normal transmission with overdrive mechanism is achieved without the necessity of providing a separate and costly unit for this purpose. Another advantage of the present arrangement is that the use of the torque converter in all speed ratios further cushions the automatic shifts between speed ratios so that the shifts become so smooth that they can scarcely be noticed during the operation of the vehicle.

In automatic transmissions it is necessary to provide manually operated means for shifting the transmission between forward and reverse operation, with an intermediate neutral position. In the above-mentioned copending application, the shift between forward, neutral and reverse was accomplished by brake friction bands engaging drums carried by the clutch and planet carriers of the transmission. The same general scheme is employed in the present invention, but the brake friction means and the actuating means therefor have been substantially improved. Notable among the improvements is the provision of a self-contained unitary actuating assembly which can be completely preassembled as a unit and then installed in the transmission simply by mounting the supporting member of the assembly upon the transmission housing. Not only does this greatly simplify the initial assembly by making the unit available for a bench assembly, but in addition maintenance and repair problems are also greatly simplified. The construction is such that the brake friction bands are applied by spring pressure, so that a uniform application is always made with resulting improvement in smoothness of operation, and the brake bands released from frictional engagement with the drum by manually operated cam means. Little effort is needed to move the shifting mechanism between forward, neutral and reverse, and no adjustment is necessary for wear of the brake band.

Still another object of the present invention is to provide means automatically operable to prevent the operator from shifting the transmission into reverse during forward motion of the vehicle. This prevents the transmission mechanism from being accidentally damaged and is used in combination with the shift mechanism for the brake friction means mentioned above.

A still further object of the present invention is to provide, in an automatic transmission of the type in which provision must be made for overrunning between certain of the transmission parts during forward speed operation, means whereby a positive drive in the reverse direction can be obtained between these parts to provide engine braking for downhill operation in the required speed ratio. This is accomplished by providing a two-way overrunning clutch which will permit a positive drive in forward low speed and permit overrunning during forward second speed operation, yet which will provide a positive drive through the transmission in the reverse direction when it is desired to use the engine for braking in low speed during downhill operation.

Additional objects will be made more apparent as this description proceeds, particularly when considered in connection with the accompanying drawings, in which.

Figure 6:
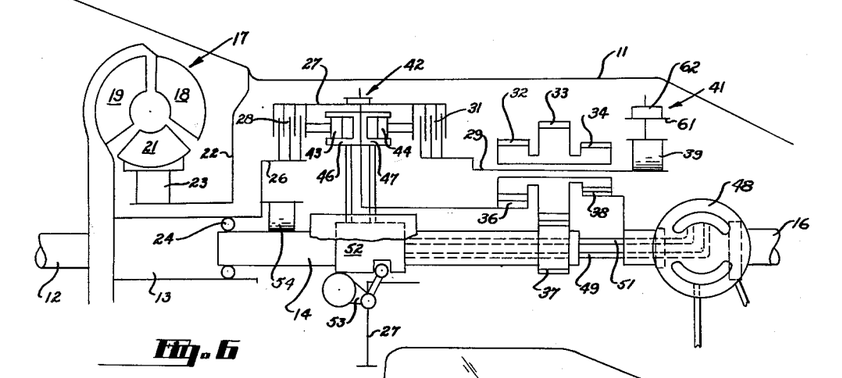
Figure 6 is a longitudinal vertical schematic drawing of the transmission.

It will be noted that the general construction of the transmission is shown schematically in Figure 6, and that certain portions thereof correspond generally to portions of the transmission shown in the above-mentioned copending application, reference being made thereto for a more detailed description and illustration of such common mechanism.

Referring now more particularly to the drawings, there is shown an automatic transmission housed within a casing 11 and having a drive shaft 12 adapted to be connected to the crankshaft of the vehicle engine, a pair of coaxial intermediate shafts 13 and 14, and a load shaft 16 adapted to be connected to the rear axle drive means of the vehicle. The transmission includes a torque converter 17 having an impeller 18 driven directly by the drive shaft 12, a turbine 19 connected directly to the first intermediate shaft 13, and a reaction member 21 connected to a flange 22 of the transmission casing through an overrunning brake 23. The overrunning brake 23 normally allows the reaction member 21 to take the reaction of the fluid circuit, but when the output torque drops below the input torque allows the reaction member to overrun so that the torque converter will function as a fluid coupling.

The first and second intermediate shafts 13 and 14, respectively, are mounted for relative rotation by means of the bearings 24, and the first intermediate shaft 13 is provided with an extension 26 adapted to be operatively connected to a clutch carrier 27 by means of a second speed clutch 28. The clutch carrier 27 is also adapted to be locked to a planet carrier 29 by means of a third speed clutch 31. The second and third speed clutches are adapted to be actuated automatically by hydraulic mechanism to be mentioned later.

The planet carrier 29 is mounted for rotation about the axis of the second intermediate shaft 14 and carries clusters of planet pinions 32, 33 and 34. Planet pinions 32 mesh with a sun gear 36 carried by the clutch carrier 27, planet pinions 33 with a sun gear 37 mounted upon the second intermediate shaft 14, and planet pinions 34 with the sun gear 38 carried by the load shaft 16. In order to transmit torque through the multiple planetary gearing system in the forward direction, an overrunning clutch 39 is connected to the planet carrier 29. The overrunning clutch is adapted to be selectively connected to the transmission casing by means of the forward speed brake mechanism 41, to be described more in detail hereinafter. To condition the transmission to transmit torque in reverse direction, reverse speed brake mechanism 42 is provided to selectively lock the clutch carrier 27 to the transmission casing. The reverse speed mechanism will also be more fully described later.

The second and third speed clutches 28 and 31 are actuated by pistons 43 and 44 housed within cylinders 46 and 47 respectively, and fluid under pressure for operating the clutches is supplied by a fluid pump 48 driven by the load shaft 16 and transmitted through conduits 49 and 51 to the cylinders 46 and 47 respectively, see Figure 6.

The flow of fluid through conduits 49 and 51 is controlled by a sleeve valve 52, the position of which is regulated by a centrifugal governor 53 mounted upon the clutch carrier 27. In low speed, the governor controlled valve 52 blocks the flow of fluid through both conduits 49 and 51 and, accordingly, neither the second or third speed clutch is operated. Power is then transmitted from the drive shaft 12 through the torque converter 17 to the first intermediate shaft 13. An overrunning clutch 54 is provided between the first and second intermediate shafts 13 and 14 and enables the second shaft 14 to be driven by the first shaft 13, but permits overrunning when the speed of the second shaft 14 exceeds that of the first shaft 13. The power flow is then through sun gear 37, planet pinions 33 and 34, and sun gear 38 to the load shaft 16, driving the latter in the forward direction in the low speed range. Inasmuch as the torque converter 17 transmits torque and speed in a continuously variable fashion within its operating limits, which may be in the neighborhood of 3 or 4 to 1, adequate torque for all starting and high load conditions is available and it is possible to design the multiple planetary gear set so that the low speed gear ratio is relatively small. For example, the low speed gear ratio may be approximately 2 to 1, even when used with a relatively low rear axle ratio, with the result that the steps between low and the succeeding gear ratios can be held to a minimum to achieve smooth shifting and maximum performance under all conditions.

The transmission is automatically shifted to second speed when the rotational speed of the clutch carrier 27 increases to such an extent that radial displacement of the centrifugal governor 53 and axial displacement of the sleeve valve 52 causes the conduit 49 to be opened, admitting fluid under pressure to the second speed clutch cylinder 46. The second speed clutch piston 43 is then actuated to apply the second speed clutch 28 and lock the first intermediate shaft 13 to the clutch carrier 27. The power flow is then from the drive shaft 12 through the torque converter 17 to the first intermediate shaft 13, and thence through the second speed clutch 28 and clutch carrier 27 to the sun gear 36. A reduction is then effected through planet pinions 32 and 34 and sun gear 38 to rotate the load shaft 16 in the forward direction at an intermediate or second speed ratio. A second speed gear ratio in the neighborhood of 1.4 to 1 has been found satisfactory, and inasmuch as this ratio is relatively close to both the low speed ratio of approximately 2 to 1 and the high speed ratio of 1 to 1, the transition steps are held to a minimum. Since the steps are small, and the torque converter incorporated in the power train during all speed ratios, the shifts between the various speed ratios can be effected with extreme smoothness.

When the rotational speed of the clutch carrier 27 has increased a further predetermined amount, the governor controlled sleeve valve 52 is shifted to a position establishing fluid communication through conduit 51 to the third speed clutch cylinder 47. Piston 44 in the cylinder applies the third speed clutch 31 and results in the rotation as a unit of the clutch carrier 27, planet carrier 29, and the triple planetary pinion. Accordingly, a direct drive is established through the gear portion of the transmission, modified only by the flexibility of the torque converter, which remains in the power train.

It will be noted that during second and third speed operation, the second intermediate shaft 14 rotates in the forward direction at a speed exceeding the speed of the first intermediate shaft 13, this being permitted by the overrunning clutch 54. It will also be noted that none of the shifts are "timed" shifts, thus further promoting smooth operation.

Although the production cost of the present transmission is slightly higher than that of the transmission shown in the above-mentioned copending application, the operating performance and the smoothness obtained are considerably improved, thus providing a transmission satisfactory for the most discriminating motorist.

Figure 2:
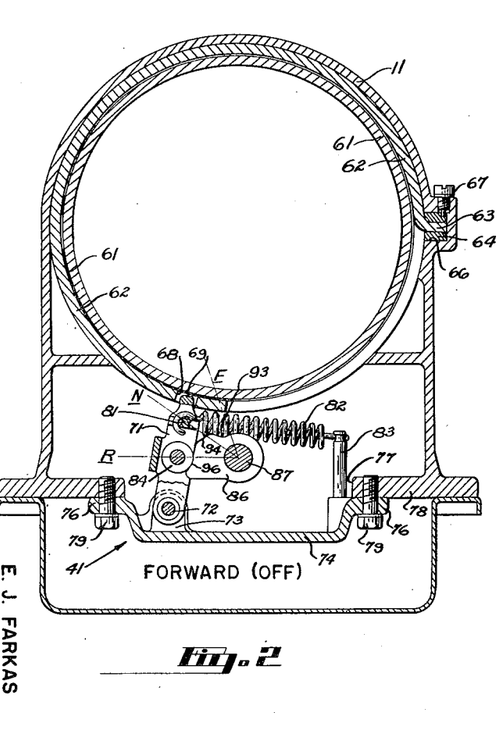
Figure 2 is a transverse cross sectional view through the forward speed brake mechanism, taken substantially on the plane indicated by the lines 2—2 of Figure 1, with the forward brake band in its off-position.
Figure 3:
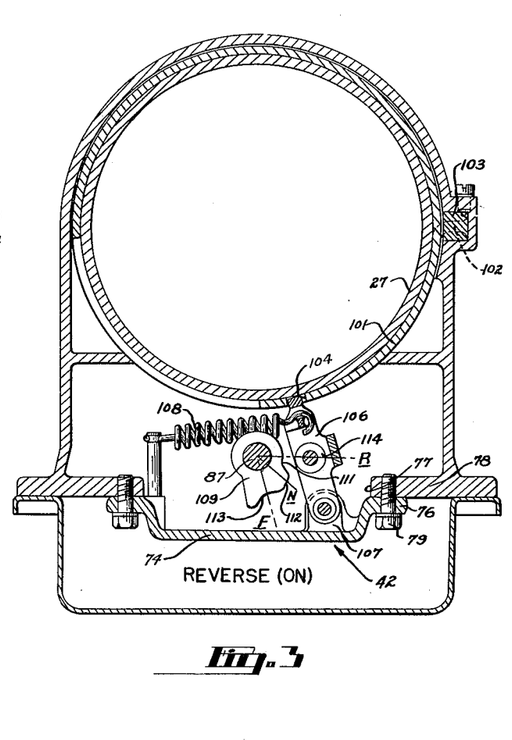
Figure 3 is a transverse cross sectional view through the reverse speed brake mechanism, taken substantially on the plane indicated by the line 3—3 of Figure 1, with the reverse brake band in its on-position.
Figure 4:
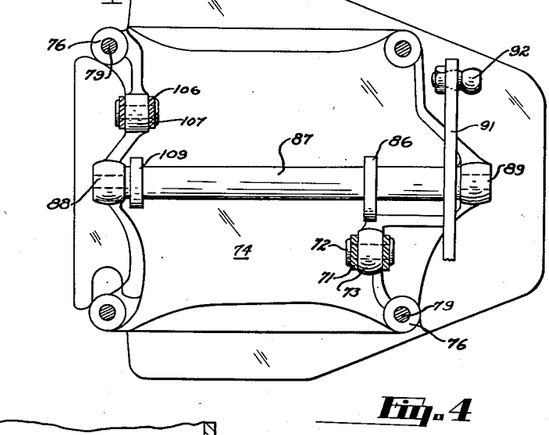
Figure 4 is a plan view of the supporting plate for the brake actuating subassembly.

The ease of operation of the present transmission is also enhanced by the brake friction means used to place the transmission in forward and reverse speeds. For a disclosure of this mechanism, reference is made particularly to Figures 2, 3, and 4, Figure 2 showing the forward speed brake mechanism and Figure 3 the reverse speed brake mechanism. The forward speed brake mechanism shown in Figure 2 will first be described.

A rotatable brake drum 61 is connected to the overrunning clutch 39 and is adapted to be retarded by a brake band 62 comprising a number of convolutions, in this instance 2¾ turns, encircling the brake drum and adapted to be contracted into frictional engagement therewith. The inner surface of the brake band is preferably copper plated to provide smooth engagement with the drum and additional wearing qualities. One end of the brake band is formed with a flange 63 received within an anchor block 64 and held therein by flaring the end of the flange. The anchor block seats within a recess 66 formed in a boss in the transmission casing 11 and is held against longitudinal displacement by a locating pin 67. Adjacent the brake band 62, the inner surface of the transmission casing 11 is machined to provide a smooth accurate surface upon which the brake band seats in its released position. The band is originally stressed so as to have a natural tendency to expand into released position adjacent the casing.

The opposite or unanchored end of the band is provided with an elongated slot 68 into which the upper end 69 of an actuating lever 71 projects. The lever 71 is generally U-shaped and is pivotally mounted at its lower end upon a pivot pin 72 carried in a boss 73 formed upon the supporting plate 74. The plate 74 has flanges 76 adapted to overlap an opening 77 formed in the base 78 of the transmission casing, being bolted thereto by bolts 79. A rib 81 is formed adjacent the top of the actuating lever 71 and provides a support for one end of a coil spring 82, the opposite end of which is attached to a stud 83 extending upwardly from the supporting plate 74. A coil spring 82 continually urges the actuating lever and the brake band in a direction to contract the band and apply the latter to the brake drum 61. A uniform brake applying force is thus always obtained.

Figure 1:
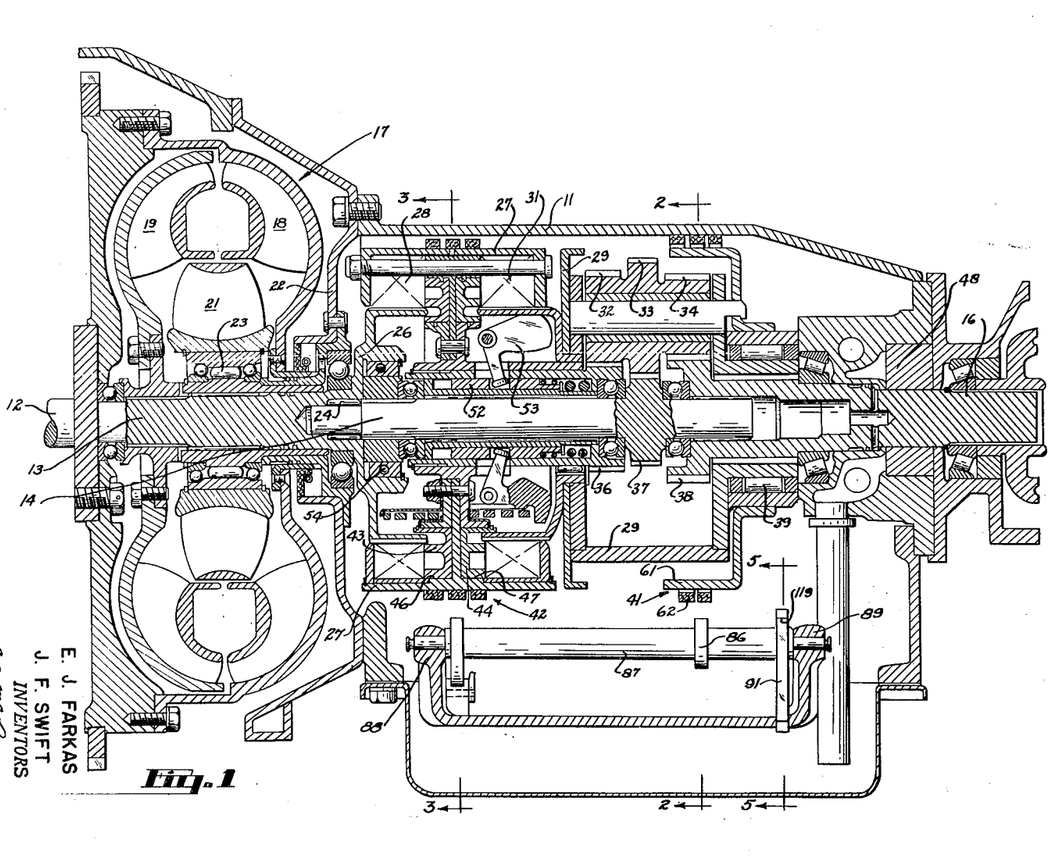
Figure 1 is a longitudinal sectional view through the transmission.

Intermediate its ends the actuating lever 71 rotatably supports a cam follower 84 which is adapted to be engaged by a cam 86 to move the actuating lever against the action of spring 82 to release the brake band. Cam 86 is mounted upon a camshaft 87, best shown in Figures 1 and 4 as extending longitudinally of the transmission and journaled in flanges 88 and 89 extending upwardly from opposite ends of the supporting plate 74.

An arm 91 is fixedly mounted upon the camshaft 87 and carries a connection 92 at one end adapted to be connected to suitable linkage (not shown) controlled by a manually operated lever preferably mounted upon the steering column of the vehicle. Referring again to Figure 2, it will be noted that the periphery of the cam 86 is so formed as to provide three angularly spaced depressions 93, 94 and 96. The depressions 93, 94 and 96 are spaced different radial dimensions from the camshaft 87 and engage the cam follower 84 to provide forward, neutral and reverse positions respectively. In addition, the depressions function to index the cam between its operative positions.

In the position shown in Figure 2, the cam follower 84 upon the actuating lever is engaged by the surface 96 of the cam, and since this is the predetermined position for reverse speed operation, the actuating lever 71 is moved against the action of the coil spring 82 to release the brake band 62 from engagement with drum 61, thus rendering the forward speed brake mechanism inoperative. It will be seen that counterclockwise rotation of cam 86 to the neutral position indicated by the reference character 94 also renders the forward speed brake mechanism inoperative, and that further counterclockwise rotation to the forward speed position indicated at 93 allows the coil spring to move the brake band into frictional engagement with the drum to apply the forward speed brake and condition the transmission for forward speed operation. Thus, a positive control of the application of the forward speed brake is achieved.

Although the brake band 62 is designed with inherent resiliency tending to release it from the drum, it may have a tendency to drag slightly under certain conditions. To avoid this, the slot 68 in the end of the band is made slightly longer than the upper end 69 of the actuating lever, so that the brake band is positively released from the brake drum when the actuating lever is moved by the cam against the action of the coil spring.

Figure 3 illustrates the reverse speed braking mechanism, which is generally similar in construction to that of the forward speed braking mechanism described above. In this view, the camshaft 87 is shown in the same angular position as in Figure 2, the reverse speed band being on and the forward speed band being off. The reference character 101 indicates the reverse speed band which is formed of spring steel and comprises 3¼ turns. The end 102 of the band is anchored in an anchor block 103 which, in turn, is mounted in the transmission casing. The opposite end of the band is formed with an elongated slot 104 into which the upper end of the actuating lever 106 projects. The actuating lever is pivotally mounted upon a boss 107 formed at one side of the supporting plate 74. A brake applying spring 108 operates to contract the brake band 101 into frictional engagement with the exterior surface of the clutch carrier 27 which functions as a brake drum.

The reverse speed cam 109 carried by the camshaft 87 is identical in shape with the forward speed cam 86, but is mounted upon the camshaft in a reversed manner. The cam surfaces 111, 112 and 113 engage the cam follower 114 carried by the actuating lever 106 in the reverse, neutral and forward speed positions, respectively. The cam is shown in its reverse position, and it will be noted that in this position considerable clearance is provided between the cam follower and the cam so that the spring 108 is free to move the brake band into frictional engagement with the drum. Furthermore, the clearance between the cam and the cam follower provides for wear of the brake band surface. The arrangement is such that no adjustment is necessary even though the brake band wears considerably since the spring will continue to move the brake band into frictional engagement with the drum, and the cam, regardless of wear, will be operative to move the brake actuating lever against the spring action to a released position.

It will be apparent that the cams 86 and 109 are angularly arranged upon the camshaft 87 so that the corresponding cam surfaces upon the two cams are always positioned diametrically opposite each other. In other words, with the camshaft in the position shown, the reverse speed cam surfaces 96 and 111 upon the two cams are positioned diametrically opposite each other and in alignment with the cam followers upon the actuating levers. It follows that in this position the reverse speed band 101 is on and the forward speedband 62 is off. When the camshaft has been turned to a position such that cam surfaces 94 and 112 are in alignment with the cam followers, both the forward and the reverse speed bands will be released from their respective drums and the transmission will be in neutral. Similarly, when the forward speed cam surfaces 93 and 113 upon the two cams, respectively, are arranged in alignment with the cam followers the forward speed band 62 is on and the reverse speed band 101 is off.

It will be seen that the entire brake actuating mechanism, both for the forward and the reverse speed brake bands, is mounted upon and carried by the supporting plate 74. With this arrangement the entire brake actuating mechanism can be assembled upon the plate 74 as a bench assembly prior to the final assembly of the transmission, greatly simplifying and reducing the cost of the assembly since it is relatively simple to assemble the parts as a subassembly whereas it would be comparatively difficult because of space requirements to assemble the parts within the transmission casing. After the subassembly has been completed, it is only necessary to place the camshaft in neutral position so that each of the brake actuating levers is held in an off-position, after which the entire subassembly can be inserted into the transmission casing through the opening 77 in the base 78. Inasmuch as the brake bands 62 and 101 normally assume a released position due to their inherent resiliency, the upper ends of the brake actuating levers 71 and 106 will automatically be in alignment with the slots 68 and 104 formed respectively in the ends of the bands. To complete the final assembly, it is only necessary to attach the supporting plate 74 to the base of the casing by the bolts 79. In addition to thus simplifying the original assembly of the brake actuating mechanism, maintenance of the transmission is also greatly facilitated.

Figure 5:
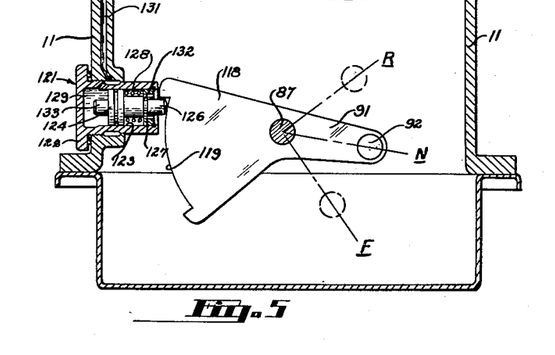
Figure 5 is a transverse cross sectional view through the reverse speed lockout mechanism, taken substantially on the plane indicated by the line 5—5 of Figure 1.

Inadvertent shifting of the manually controlled shift lever to its reverse position while the vehicle is traveling forward may possibly result in serious damage to the working parts of the transmission. The present invention provides means automatically operable to prevent such an occurrence. Referring now to Figure 5, it will be noted that the arm 91 carried at one end of the camshaft 87 is formed with a quadrant shaped portion 118, the periphery of which is arcuate and formed with an elongated arcuate slot 119. Mounted in the side wall of the transmission casing 11 adjacent the quadrant shaped portion 118 of the arm is a reverse lockout assembly 121. This assembly comprises a cylindrical housing 122 screwed into a threaded opening formed in the transmission casing and provided with a cylindrical bore 123 therein. A piston 124 is reciprocably mounted within the bore 123 and carries at its inner end a cylindrical extension 126 piloted in a guide member 127.

The piston 124 is adapted to be urged inwardly against the action of a coil spring 128 by fluid pressure in the fluid chamber 129 formed in the housing at one end of the piston. Fluid under pressure from the fluid pump 48 is directed to the fluid chamber 129 through a fluid conduit 131 formed in the transmission casing.

During normal operation of the vehicle in a forward direction, fluid pressure is generated by the fluid pump 48 and supplied to the fluid chamber 129, forcing the piston 124 inwardly so that the extension 126 at the end of the piston is moved into the slot 119 formed in the portion 118 of the arm 91. The movement of the piston under the action of fluid pressure is limited by engagement of the shoulder 132 on the extension with the guide member 127. With the reverse lockout assembly thus in operation, movement of the arm 91 between neutral and forward positions is permitted, as will be seen from an examination of Figure 5, but engagement of the extension 126 with the end of the slot 119 prevents movement of the arm to the reverse position. Inasmuch as the fluid pump 48 generates fluid pressure at all times during forward movement, being driven by the load shaft 16, shifting of the transmission into reverse during forward speed of the vehicle is effectively prevented.

On the other hand, when the vehicle is stopped the fluid pump is inoperative and no fluid pressure is supplied to the reverse lockout assembly. The return spring 128 is then effective to move the piston outwardly until the stop 133 carried by the piston engages the end of the housing, in which position the extension 126 is completely retracted out of the slot 119 in the arm. The shift lever and the arm 91 can then be moved to reverse position. The lockout mechanism is thus entirely automatic and requires no attention on the part of the operator, yet is effective to prevent possible damage to the transmission mechanism by making it impossible to inadvertently shift the transmission into reverse when the vehicle is traveling in a forward direction.

In the form of the transmission shown in Figures 1 to 6 inclusive, second speed can be used as a hill brake to obtain the benefits of engine braking. In addition, second speed provides a solid drive back to the torque converter and the engine to enable the latter to be started when stalled by pushing the vehicle. As mentioned before, among the advantages of the present invention is the fact that the particular combination enables the various gear reductions to be relatively low, thus achieving extreme smoothness in operation. This means, however, that the gear reduction in second speed may not be sufficiently high to provide adequate engine braking for hill operation. It is thus desirable to provide means whereby low speed can be used to provide engine braking at the requisite gear reduction. It will be noticed, however, that the overrunning clutch 54 between the first intermediate shaft 13 and the second intermediate shaft 14 prevents the transmission of power through the transmission in the reverse direction from the load shaft 16 to the driveshaft 12 in low speed, since the clutch 54 overruns when the speed of the shaft 14 exceeds that of the shaft 13.

Figure 7:
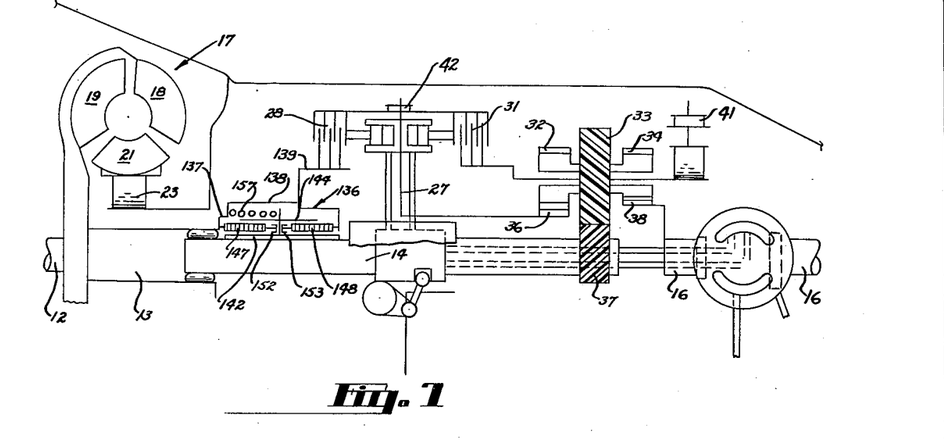
Figure 7 is a longitudinal vertical schematic drawing of a modified transmission.
Figure 8:
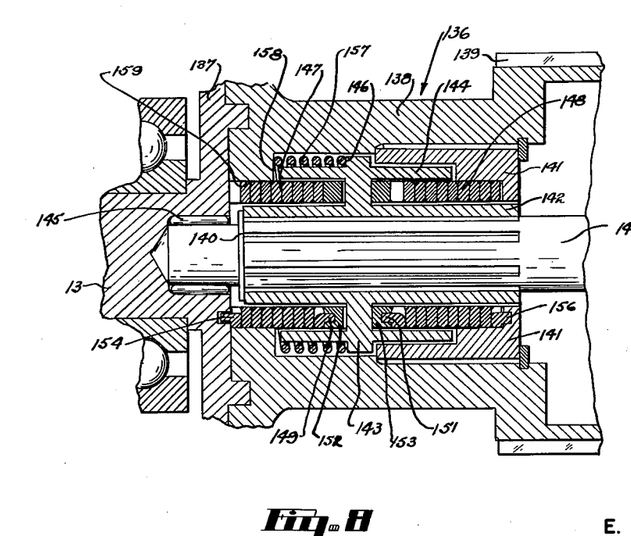
Figure 8 is an enlarged fragmentary longitudinal cross sectional view illustrating the two-way overruning clutch of the modification shown diagrammatically in Figure 7.

The modification of the invention shown in Figures 7 and 8 is particularly designed to enable low speed to be used in engine braking. Referring to the schematic drawing of Figure 7, it will be noted that the transmission construction in general is the same as that shown in Figure 6, but that the overrunning clutch 54 between the first and second intermediate shafts 13 and 14 has been replaced by a specially designed two-way overrunning clutch 136, and that the low sun front gear 37 and its associated planet pinions 33 are formed with helical or spiral teeth.

As best seen in Figure 8, the first intermediate shaft 13 is provided with an end flange 137 which carries a hub 138 having a splined enlargement 139 at the opposite end upon which are mounted the plates of the second speed clutch 28. An auxiliary hub member 141 is removably mounted within one end of the hub 138.

Mounted for rotation with the second intermediate shaft 14 is a sleeve 142, which is preferably splined to the shaft and which is held against axial movement relative to the shaft by a retaining ring 140. The forward end of shaft 14 is reduced in diameter and is piloted in the adjacent end of shaft 13 by bearings 145. The construction is such that a limited amount of axial reciprocation of shaft 14 in the transmission is permitted, for a purpose which will appear later. The sleeve 142 is formed with an integral radially extending web 143 which, in turn, supports an annular axially extending rim 144. The web 143 extends slightly beyond the rim 144 to form an annular shoulder 146.

In the annular spaces thus formed between the sleeve 142 and the rim 144 on opposite sides of the web 143 are mounted a pair of spring clutches 147 and 148. These spring clutches are of conventional type and embody a number of convolutions of spirally wound spring steel wire. The adjacent ends of the spring clutches 147 and 148 are bent to form tabs 149 and 151, respectively. These tabs extend into openings formed in the annular bearing washers 152 and 153, respectively. The radial faces of the bearing washers are adapted to frictionally engage the opposite sides of the web 143 of the sleeve 142.

The opposite ends of the spring clutches 147 and 148 are similarly formed with tabs 154 and 156, respectively, which are received within openings in the first intermediate shaft 13 and in the auxiliary hub 141 which, of course, is carried by the shaft 13 through the intermediate hub 138. A coil spring 157 is positioned between the shoulder 146 formed upon the web 143 of the sleeve and a shoulder 158 formed in the hub 138. The coil spring normally functions to urge the reciprocable sleeve 142 to the right as seen in Figures 7 and 8 and to thus maintain frictional engagement between the bearing washer 153 and the adjacent face of the web 143.

In operation, the transmission functions as follows: When the vehicle is running in low speed forward, the first intermediate shaft 13, which is driven from the vehicle engine through the torque converter 17, transmits power to the second intermediate shaft 14 through the medium of the hub 138, auxiliary hub 141, spring clutch 148, bearing washer 153, and sleeve 142. This drive is made possible by the fact that the spring clutch 148 expands into frictional engagement with the rim 144 when actuated. Inasmuch as the coil spring 157 urges the sleeve 142 to the right so that the web 143 frictionally engages the bearing washer 153, rotation of the tab 151 at the opposite end of the spring clutch 148 by the auxiliary hub 141 tends to unwind the convolutions of the spring clutch and to expand the latter. During low speed operation, the spring clutch 147 overruns, since the coil spring 157 holds the web 143 out of frictional engagement with the bearing washer 152.

In second speed, the drive is through the second speed clutch 28, by-passing the two-way overrunning clutch 136 and then through the clutch carrier 27 to the sun gear 36, planet pinions 32 and 34, and sun gear 38 to the load shaft 16. During this second speed operation, the second auxiliary shaft 14 is permitted to run faster than the first intermediate shaft 13 by means of the two-way overrunning clutch, the spring clutch 147 being inoperative and the spring clutch 148 being contracted out of frictional engagement with the rim 144.

In third or high speed, the operation of the modified transmission is identical with that of the form shown in Figures 1 to 6 inclusive, inasmuch as the entire planet gear locks up and rotates as a unit to deliver power in the forward direction at a unitary ratio.

When it is desired to transmit power through the transmission in the reverse direction, as during taxi starts or when using the engine as a brake during downhill operation, the modified transmission shown in Figures 7 and 8 can be placed in either first or second speed whereas the form shown in Figures 1 to 6 inclusive will function to transmit power in the reverse direction only in second speed and not in low. In view of the fact that the gear reduction in second speed is only in the neighborhood of 1.41 to 1, and thus relatively low in comparison with normal second speed gear ratios, under some circumstances insufficient engine braking is obtained in second speed and recourse must be had to the higher gear ratio of low speed. The power flow under the latter circumstances is from the load shaft 16 to the load shaft sun gear 38 and through the planet pinions 34 and 33 to the sun gear 37 on the second intermediate shaft 14. Inasmuch as the planet pinions 33 and the sun gear 37 are helical gears, a longitudinal or axial thrust is imposed upon the second intermediate shaft 14 in a leftward direction as seen in Figures 7 and 8. As mentioned above, shaft 14 is mounted for limited axial movement, and the thrust of the helical gears moves the shaft 14 and the sleeve 142 against the action of the compression coil spring 157. This results in moving the web 143 of the sleeve away from the adjacent radial surface of the bearing washer 153 associated with the spring clutch 148 so that there is no longer any frictional engagement between the washer and the web. This renders the spring clutch 148 inoperative. At the same time, however, the web 143 is moved into frictional engagement with the bearing washer 152 associated with the spring clutch 147. Thus actuated, the spring clutch 147 is expanded into frictional engagement with the rim 144 of the sleeve and also with the bore 159 of the hub 138. A positive power path is thus established from the shaft 14 to the shaft 13. This enables the engine to be used as a brake and, in addition, enables the transmission to be placed in low gear during taxi starts when pushing the vehicle to start a stalled engine.

From the foregoing it will be seen that the two-way overrunning clutch 141 not only permits the necessary overrunning between the shafts 13 and 14 when the transmission is operating in the forward direction, but also enables low gear to be used as an engine braking gear ratio. Without a mechanism of this type, it would be impossible to use low speed for engine braking, since an overrunning clutch between the two intermediate shafts is essential with transmissions of the multiple planetary type in which three speeds forward are obtained with a single multiple planetary gearset. In other words, the two-way overrunning clutch provides a drive in the forward direction at low speed and overruns during forward second speed operation when the speed of the second intermediate shaft 14 exceeds that of the first intermediate shaft 13, yet permits a positive drive from the same shaft 14 to the shaft 13 in the reverse direction without overrunning, to provide engine braking in low gear.

It will be understood that the invention is not to be limited to the exact construction shown and described, but that various changes and modifications may be made without departing from the spirit and scope of the invention, as defined in the appended claims.

What is claimed is:

1. In a variable speed power transmission, in combination, a housing, a drive shaft, first and second coaxial intermediate shafts, and a load shaft, a torque converter having an impeller driven from said drive shaft, a turbine operatively connected to said first intermediate shaft, and a reactor connected through an overrunning brake to said housing, a multiple planetary gearing system between said second intermediate shaft and said load shaft comprising planet pinions rotatably supported about the axis of said second intermediate shaft and respectively meshing sun gears carried by said intermediate shaft and said load shaft, a clutch carrier rotatably supported about the axis of said intermediate shafts and supporting one of said sun gears, an overrunning clutch between said first and second intermediate shafts, friction clutch means carried by said clutch carrier for selectively connecting together said first intermediate shaft and said clutch carrier, and additional friction clutch means for selectively connecting together said clutch carrier and said planet carrier.

2. In a variable speed transmission, in combination, a driveshaft, first and second intermediate shafts, and a load shaft, a multiple planetary gearing system between said second intermediate shaft and said load shaft comprising planet pinions rotatably supported about the axis of said second intermediate shaft and respectively meshing sun gears carried by said second intermediate shaft and said load shaft, first clutch means providing a positive drive from said first intermediate shaft to said second intermediate shaft in one forward speed ratio and permitting said second intermediate shaft to overrun said first intermediate shaft during forward speed operation in another speed ratio, and second clutch means interconnecting said first and second intermediate shafts automatically providing for power transmission from said load shaft to said second intermediate shaft in said first-mentioned speed ratio.

3. In a variable speed transmission, in combination, a driveshaft, first and second intermediate shafts, and a load shaft, a multiple planetary gearing system between said second intermediate shaft and said load shaft comprising planet pinions rotatably supported about the axis of said second intermediate shaft and respectively meshing sun gears carried by said second intermediate shaft and said load shaft, first clutch means providing a positive drive from said first intermediate shaft to said second intermediate shaft in one forward speed ratio and permitting said second intermediate shaft to overrun said first intermediate shaft during forward speed operation in another speed ratio, and second clutch means interconnecting said first and second intermediate shafts automatically providing for power transmission from said load shaft to said second intermediate shaft in said first-mentioned speed ratio, said first and second clutch means comprising overrunning clutches disposed between said first and second intermediate shafts and reversely arranged with respect to each other.

4. In a variable speed transmission, in combination, a driveshaft, first and second intermediate shafts, and a load shaft, a multiple planetary gearing system between said second intermediate shaft and said load shaft comprising planet pinions rotatably supported about the axis of said second intermediate shaft and respectively meshing sun gears carried by said second intermediate shaft and said load shaft, first clutch means providing a positive drive from said first intermediate shaft to said second intermediate shaft in one forward speed ratio and permitting said second intermediate shaft to overrun said first intermediate shaft during forward speed operation in another speed ratio, and second clutch means interconnecting said first and second intermediate shafts automatically providing for power transmission from said load shaft to said second intermediate shaft in said first-mentioned speed ratio, said first and second clutch means comprising overrunning clutches disposed between said first and second intermediate shafts and reversely arranged with respect to each other, said sun gear carried by said second intermediate shaft and the planet pinions meshing therewith having spiral teeth producing an axial thrust on said second intermediate shaft when power is transmitted from said last-mentioned planet pinions to said last-mentioned sun gear to control the operation of said overrunning clutches.

EUGENE J. FARKAS.
JOHN F. SWIFT.

REFERENCES CITED

The following references are of record in the file of this patent:

UNITED STATES PATENTS

| Number | Name | Date |
|---|---|---|
| 1,888,191 | Wilson | Nov. 15, 1932 |
| 1,975,835 | Farkas | Oct. 9, 1934 |
| 2,144,795 | Cotterman | Jan. 24, 1939 |
| 2,182,386 | Patterson | Dec. 5, 1939 |
| 2,182,621 | Dodge | Dec. 5, 1939 |
| 2,298,648 | Russell | Oct. 13, 1942 |
| 2,324,713 | McFarland | July 20, 1943 |
| 2,332,593 | Nutt et al. | Oct. 26, 1943 |
| 2,333,682 | Schneider | Nov. 9, 1943 |
| 2,343,955 | Cotterman | Mar. 14, 1944 |
| 2,346,365 | Duffield | Apr. 11, 1944 |
| 2,355,427 | Duffield | Aug. 8, 1944 |
| 2,372,817 | Dodge | Apr. 3, 1945 |
| 2,408,008 | Tipton | Sept. 24, 1946 |
| 2,456,328 | Schneider | Dec. 14, 1948 |